(No Model.)
Z. H. MILLER.
PLANTER.
No. 529,660. Patented Nov. 20, 1894.
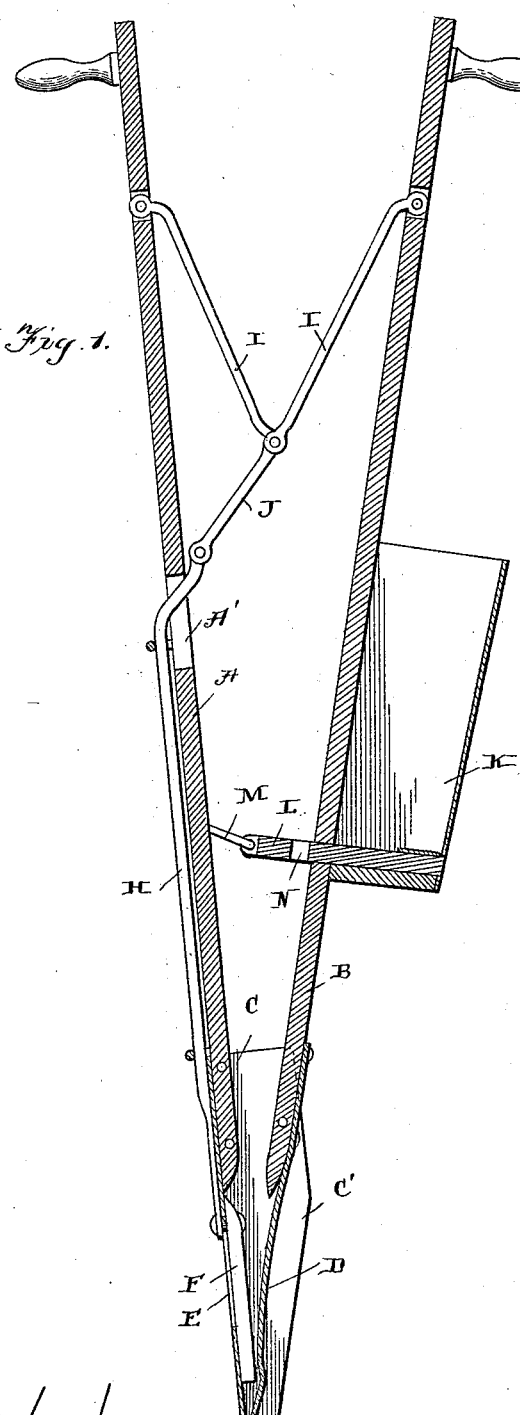
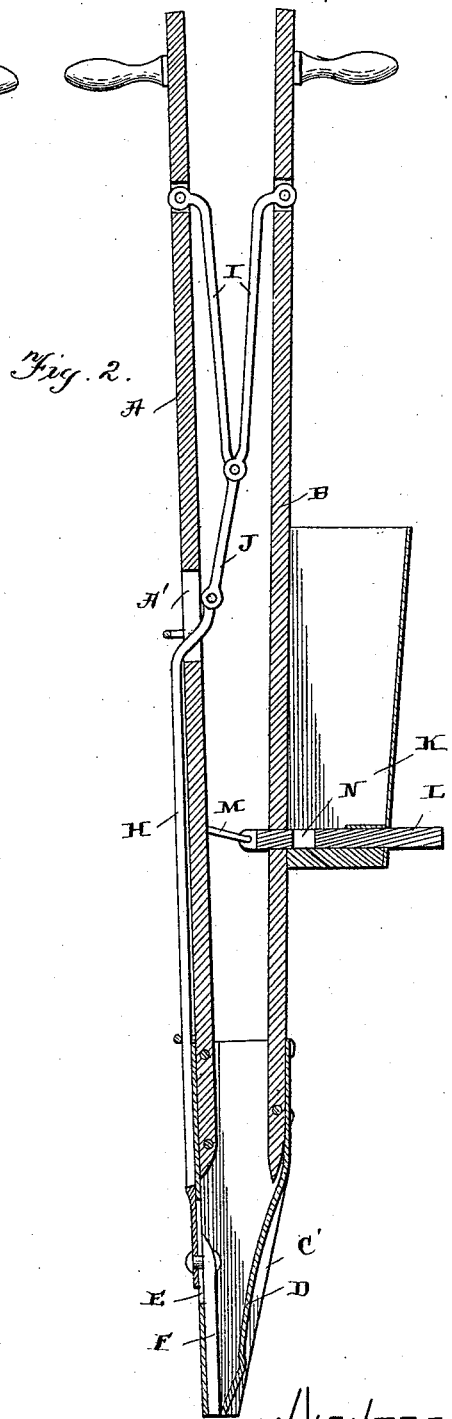

UNITED STATES PATENT OFFICE.

ZENO H. MILLER, OF SHERWOOD, OHIO.

PLANTER.

SPECIFICATION forming part of Letters Patent No. 529,660, dated November 20, 1894.

Application filed August 6, 1894. Serial No. 519,578. (No model.)

*To all whom it may concern:*

Be it known that I, ZENO H. MILLER, of Sherwood, in the county of Defiance and State of Ohio, have invented certain new and useful Improvements in Planters; and I do hereby declare the following to be a full, clear, and exact description of the invention, such as will enable others skilled in the art to which it pertains to make and use the same, reference being had to the accompanying drawings, which form part of this specification.

My invention relates to an improvement in planters; and the object of the same is to provide an improved hand planting implement which will deposit the seed or grain with regularity, placing the same in the cavity formed for its reception after the same has been made and avoid putting the grain into the ground ahead of the cavity former which is very liable to injure the seed; and a further object of the invention is to so arrange the implement that the corn will be pushed to the bottom of the cavity after the same has been formed and is not dropped therein loosely as is ordinarily the case.

With these objects in view the invention consists in the novel features of construction hereinafter fully described and claimed and illustrated in the accompanying drawings, in which—

Figure 1 is a vertical sectional view of the implement showing its position and arrangement when forced into the ground. Fig. 2 is a similar view showing the upper end of the levers contracted and the plunger lowered as when pushing the seed into the ground.

A and B are the levers having the usual hand hold at their upper ends. The lever A has rigidly secured to its lower end the mouth piece C flanged upon its sides as shown at C' and pivoted between these sides is the lower end of lever B. The last named lever carries a tongue D which depends in the said mouth piece vibrating laterally between its flanges as will be readily understood. A plunger F which fits snugly the mouth piece is arranged therein immediately beneath the lower end of lever A and the same is moved vertically for the purpose of forcing the seed into the planting cavity after the latter has been formed. For effecting the vertical vibration of the said plunger I provide the back of the mouth piece with a slot E through which the said plunger is connected to the rod H which extends vertically on the outer side of lever A and which is bent inward at its upper end, passed through slot A' in lever A and connected on the inner side of the said slot by means of a pivot to short rod J leading to the arms I which have a pivotal movement on the inner sides of levers A and B. By means of this arrangement it will be seen that when the levers are spread into the position shown in Fig. 1 the plunger is raised and the lip D is forced back into the mouth piece completely closing the same, whereas, when the levers are contracted in the position shown in Fig. 2 the mouth piece and lip are separated and the plunger is moved downward by means of the connection above described.

The implement is forced into the ground with the levers in position shown in Fig. 1 and when a sufficient depth has been reached the same are contracted at their upper ends thus separating their lower ends and permitting the seed to drop beneath the plunger, while the latter follows immediately, the seed being moved downward by the devices hereinbefore described, thus following the seed to the lower end of the cavity and depositing it firmly therein and not permitting it simply to tumble therein and remain in a loose position.

The hopper K is rigidly secured to lever B as shown and extended transversely at its lower end is the slide L which is connected by link M to lever A. By this means the slide is reciprocated and the seed drawn from the hopper by means of an opening N in said slide into the space between the levers and dropped into the mouth piece as will be readily understood.

Having thus fully described my invention, what I claim as new, and desire to secure by Letters Patent, is—

1. In a planter the combination of a mouth piece, the levers, one of the same being fixed in the upper end of the piece and the other pivoted therein and adapted to close the same, a plunger extensible from the mouth piece and movable beneath and in line with the fixed lever, and a means for opening the mouth piece to drop the seed and independently but simultaneously moving downward the plunger to embed the seed in the earth, substantially as shown and described.

2. In a planter the combination of a seed dropper slotted vertically, the extensible plunger therein, a rod on the outer side of the dropper and connected to the plunger through the slot, levers adapted to be contracted for operating the dropper, and a connection between the upper ends of the levers and the said rod for moving the latter and the plunger downward when the seeds are dropped, substantially as shown and described.

In testimony whereof I affix my signature in presence of two witnesses.

Z. H. MILLER.

Witnesses:
   H. P. HURLEY,
   F. M. SHOOK.